(12) United States Patent
Huang et al.

(10) Patent No.: US 7,483,688 B2
(45) Date of Patent: Jan. 27, 2009

(54) NETWORK DEVICE WITH HYBRID-MODE TRANSMITTER

(75) Inventors: Chen-Chih Huang, Jhudong Township, Hsinchu County (TW); Chih-Wen Huang, Dashe Township, Kaohsiung County (TW)

(73) Assignee: Realtek Semiconductor Corp., Hsinchu (TW)

( * ) Notice: Subject to any disclaimer, the term of this patent is extended or adjusted under 35 U.S.C. 154(b) by 800 days.

(21) Appl. No.: 10/909,811

(22) Filed: Aug. 2, 2004

(65) Prior Publication Data

US 2005/0032501 A1 Feb. 10, 2005

(30) Foreign Application Priority Data

Aug. 4, 2003 (TW) .............................. 92121312 A
Apr. 28, 2004 (TW) .............................. 93111917 A

(51) Int. Cl.
*H04M 9/00* (2006.01)
(52) U.S. Cl. ........................ 455/402; 375/219; 375/220; 375/257; 375/258
(58) Field of Classification Search ................ 375/219, 375/220, 257, 258; 455/402; 327/108
See application file for complete search history.

(56) References Cited

U.S. PATENT DOCUMENTS

| | | | | |
|---|---|---|---|---|
| 5,420,499 | A | * | 5/1995 | DeShazo ..................... 323/315 |
| 6,665,347 | B2 | | 12/2003 | van Bavel et al. ........... 375/257 |
| 2002/0060587 | A1 | * | 5/2002 | Kimball et al. ............. 327/108 |
| 2003/0146772 | A1 | * | 8/2003 | Chansungsan ............... 326/30 |

* cited by examiner

*Primary Examiner*—David C Payne
*Assistant Examiner*—Leon Flores
(74) *Attorney, Agent, or Firm*—Thomas, Kayden, Horstemeyer & Risley

(57) ABSTRACT

A network device comprises a hybrid-mode transmitter for transmitting a differential transmission signal at a first transmission rate or a second transmission rate. The network device includes a first mode channel and a second mode channel. The first mode channel includes a voltage mode driver and a current mode driver for outputting the differential transmission signal. The second mode channel includes a second mode driver, which is one of a voltage mode driver and a current mode driver. The network device transmits the differential transmission signal at the first transmission rate through the voltage mode driver of the first mode channel and the second mode driver. The network device transmits the differential transmission signal at the second transmission rate through at least one of the current mode driver and the voltage mode driverfirst mode channel.

17 Claims, 9 Drawing Sheets

NETWORK DEVICE WITH HYBRID-MODE TRANSMITTER

This application claims the benefits of Taiwan applications Serial No. 92121312, filed Aug. 4, 2003 and Taiwan application Serial No. 93111917, filed Apr. 28, 2004, the subject matter of which is incorporated herein by reference.

BACKGROUND OF THE INVENTION

1. Field of the Invention

The invention relates to a network device, and more particularly to a network device with a hybrid-mode transmitter.

2. Description of the Related Art

The network application becomes more and more popular and becomes an indispensable portion in the daily life owing to the progress of the technology. In view of the increasing demands on the network bandwidth, such as the application of the on-line multimedia, the transmission rate of the network device has to be risen from the conventional 10/100 Mbs to 1 Gbs or more.

Take the network device with the rate of 1 Gbs as an example. The 1 Gbs network device has at least one port, and each port has four channels. Each one channel is coupled to a twisted pair, in order to transfer a differential transmission signal. The network device uses the four channels to communicate with another remote network device, wherein the transmitting and receiving functions are simultaneously performed in each of the channels.

A typical 1 Gbs network device has the capability downward compatible with 10/100 Mbs. When the network device is operating at the rate of 10/100 Mbs, one port only needs two channels, one of which is for transmission, and the other of which is receiving. If the network device is operating at 10 Mbs, the peak-to-peak value of the transmitted voltage is 5V. If the network device is operating at 100 Mbs/1 Gbs, the peak-to-peak value of the transmitted voltage is 2V.

In general, the transmitter in the channel is the most power-consumptive component in the network device, so the manufacturer is committed to reduce the power consumption of the transmitter in order to save the power.

The transmitters in the channels may be classified into a current mode and a voltage mode. FIG. 1A is a schematic illustration showing a conventional network device having current-mode transmitters. Herein, a network device 100 with one port will be described. The network device 100 includes a physical layer (PHY) control chip 110, a plurality of matching resistors Ri and transformers T. The physical layer control chip 110 has one port, which includes four channels 112. Each channel 112 includes a control unit and a transceiver 114, as shown in FIG. 1A. Each transmission channel has two input/output pins P to be electrically connected to a primary side of the transformers T and the matching resistors Ri. The transformer T filters out the DC component of the input or output signal. The central tap of the coil at the primary side of the transformer T is coupled to the DC power VDD, while the secondary side thereof is coupled to a twisted pair of the Ethernet. The impedance value ZL of the wire is 100 Ω, so the resistance value of the matching resistor Ri is also 100 Ω. Each channel in the current mode network device 100 has two input/output pins P, so one port includes eight input/output pins P.

FIG. 1B is a schematic illustration showing a transmitter 120 for transferring the differential transmission signal in the transceiver 114 of FIG. 1A. The transmitter 120 is an open-drain current driver, which includes a first input terminal SI1 a second input terminal SI2, transistors N1 and N2, and a current source I coupled to the transistors N1 and N2. The first input terminal SI1 and the second input terminal SI2 are for receiving input signal S. The gate electrodes of the transistors N1 and N2 are electrically connected to the first input terminal SI1 and the second input terminal SI2, respectively. The drain electrodes of the transistors N1 and N2 are electrically connected to the two input/output pins P, respectively. The source electrodes of the transistors N1 and N2 are electrically connected to the current source I. The input signal S are digital signals controlling the ON and OFF of the transistors N1 and N2, respectively. The transmitter 120 amplifies the input signal S and outputs differential transmission signals Tx+ and Tx−. Because the matching resistor Ri connected to the output terminals of the transmitter 120 in parallel is 100 Ω and the matching resistor Ri is connected to the impedance ZL of the twisted pair in parallel, the equivalent impedance of both of them are 50 Ω. Consequently, the current source I has to provide the 40 mA current so as to provide the peak-to-peak output voltage of 2V during the 100 Mbs/1 Gbs operation.

FIG. 2A is a schematic illustration showing a conventional network device having voltage-mode transmitters. The network device 200 having one port will be illustrated as an example. The network device 200 includes a physical layer control chip 210, a plurality of matching resistors Rv and transformers T. The physical layer control chip 210 has one port, which includes four channels 212. Each channel 212 includes a control unit and a transceiver 214. Each channel 212 includes four input/output pins P to be electrically connected to the corresponding matching resistors Rv at the primary sides of the transformers T. The transformer T is for filtering out the DC component of the received or output signal. The secondary sides of the transformers T are coupled to the twisted pairs of the Ethernet. The value of the impedance ZL of the wire is 100 Ω, so the resistance value of the cascaded matching resistor Rv in each channel is 500. One port of the voltage mode network device 200 needs 16 input/output pins P.

FIG. 2B is a schematic illustration showing a transmitter 222 in the transceiver 214 of FIG. 2A. The transmitter 222 includes a first input terminal SV1, a second input terminal SV2, a differential operational amplifier OP, and feedback resistors Rf1 and Rf2. The first input terminal SV1 and the second input terminal SV2 receive the input signal S. The differential operational amplifier OP has a noninverting input terminal and an inverting input terminal respectively electrically connected to the first input terminal SV1 and the second input terminal SV2. The differential operational amplifier OP further has a first output terminal and a second output terminal. Unlike the above-mentioned current-mode transmitter, the input signal S respectively inputted to the first input terminal SV1 and the second input terminal SV2 in the voltage-mode transmitter are analog current signals. The differential operational amplifier OP amplifies the input signal S and then generates differential output signals Vo1 and Vo2. The output signal Vo1 of the first output terminal is inverse to the output signal Vo2 of the second output terminal. The differential output signals Vo1 and Vo2 of the differential operational amplifier OP are fed back to the first input terminal SV1 and the second input terminal SV2 through the feedback resistors Rf1 and Rf2, respectively. Two matching resistors Rv are electrically connected to the output terminals of the differential operational amplifier OP, and the output terminals of the differential operational amplifier OP have low impedances to match with the impedance ZL of the twisted pair. Because the matching resistors Rv and the impedance ZL form a voltage-dividing circuit, if the peak-to-peak value of the output signal of the amplifier OP is (Vo1-Vo2), then peak value of the differential transmission signal (Tx+)-(Tx−) is only one half of (Vo1-Vo2), i.e., (½)*(Vo1-Vo2). If the peak-to-peak value between the differential transmission signals Tx+ and Tx− needs to be 2V, as specified by the specification of the 100 Mbs/1 Gbs network device, then the peak-to-peak value outputted from the differential operational amplifier OP has to be 2×2=4V. If the peak-to-peak value between the differential transmission signals Tx+ and Tx− has to be 5V, as specified by the specification of the 10 Mbs network device, then the peak-to-peak value outputted from the differential operational amplifier OP has to be 5V×2=10V. Hence, the voltage required by the voltage-mode transmitter is very high.

In addition, when the network device is operating at 1 Gbs, each twisted pair receives differential receiving signals from the ethernet and transmits differential transmission signals, Tx+ and Tx−, simultaneously. Therefore, the receiver 224 receives a coupled differential signals, Rx+ and Rx−, which are the coupling of the differential receiving signals and the differential transmission signals Tx+ and Tx−. The differential receiving signal is not coupled to the output signals Vo1 and Vo2 of the amplifier OP, and the receiver 224 obtains the differential receiving signals by echo cancellation, that is, by subtracting the differential transmission signals, Tx+ and Tx−, according to the signals Vo1 and Vo2, from the coupled differential signals, Rx+ and Rx−.

However, each voltage mode transceiver 214 requires two more input/output pins than each current mode transceiver 114 because the input terminals of the receiver 224 for the coupled differential signal is outside of the physical layer control chip 210 and needs to externally coupled precise resistors to obtain exact divided voltage.

The drawback of the current-mode transmitter is the great power consumption. As for the network device operating at 1 Gbs, one channel needs the current of 40 mA, and one port, which has four channels, thus needs the current of 160 mA. If the switch has four ports, the current of 640 mA is consumed. In addition, the consumed current of the current-mode transmitter is independent of the output signals because such current has to be supplied no matter the output signal is 0 or 1.

The drawbacks of the voltage-mode transmitter are that its voltage swing is larger and input/output pins are more than the current-mode transmitter. With the advance of the IC (integrated circuit) manufacturing process, the supplied voltage to the IC is getting smaller (e.g., 1.8V) for saving power. Consequently, the too-large voltage swing causes the difficulty of implementing the low-voltage integrated circuit.

SUMMARY OF THE INVENTION

It is therefore an object of the invention to provide a power-saving network device that may operate at the low-voltage environment.

It is therefore another object of the invention to provide a power-saving network device that may operate at the low-voltage environment and does not need additional input/output pins.

The invention achieves the above-identified objects by providing a network device having a hybrid-mode transmitter for transmitting a differential transmission signal at a first transmission rate or a second transmission rate, wherein the network device includes a first mode channel and at least one second mode channel. The first mode channel includes a voltage mode driver and a current mode driver for outputting the differential transmission signal. The second mode channel includes a second mode driver, which is one of a voltage mode driver and a current mode driver. The network device outputs the differential transmission signal at the first transmission rate through the voltage mode driver of the first mode channel and the second mode driver, and the network device outputs the differential transmission signal at the second transmission rate through at least one of the voltage mode driver and the current mode driver of the first mode channel.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 1A:
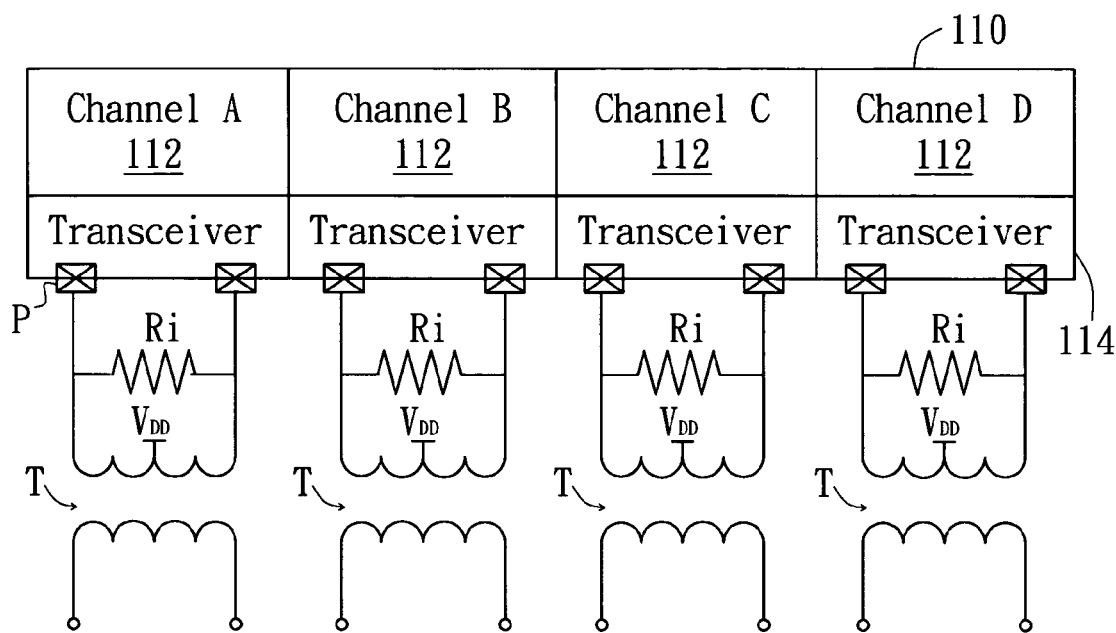
FIG. 1A is a schematic illustration showing a conventional network device having current-mode transmitters.
Figure 1B:
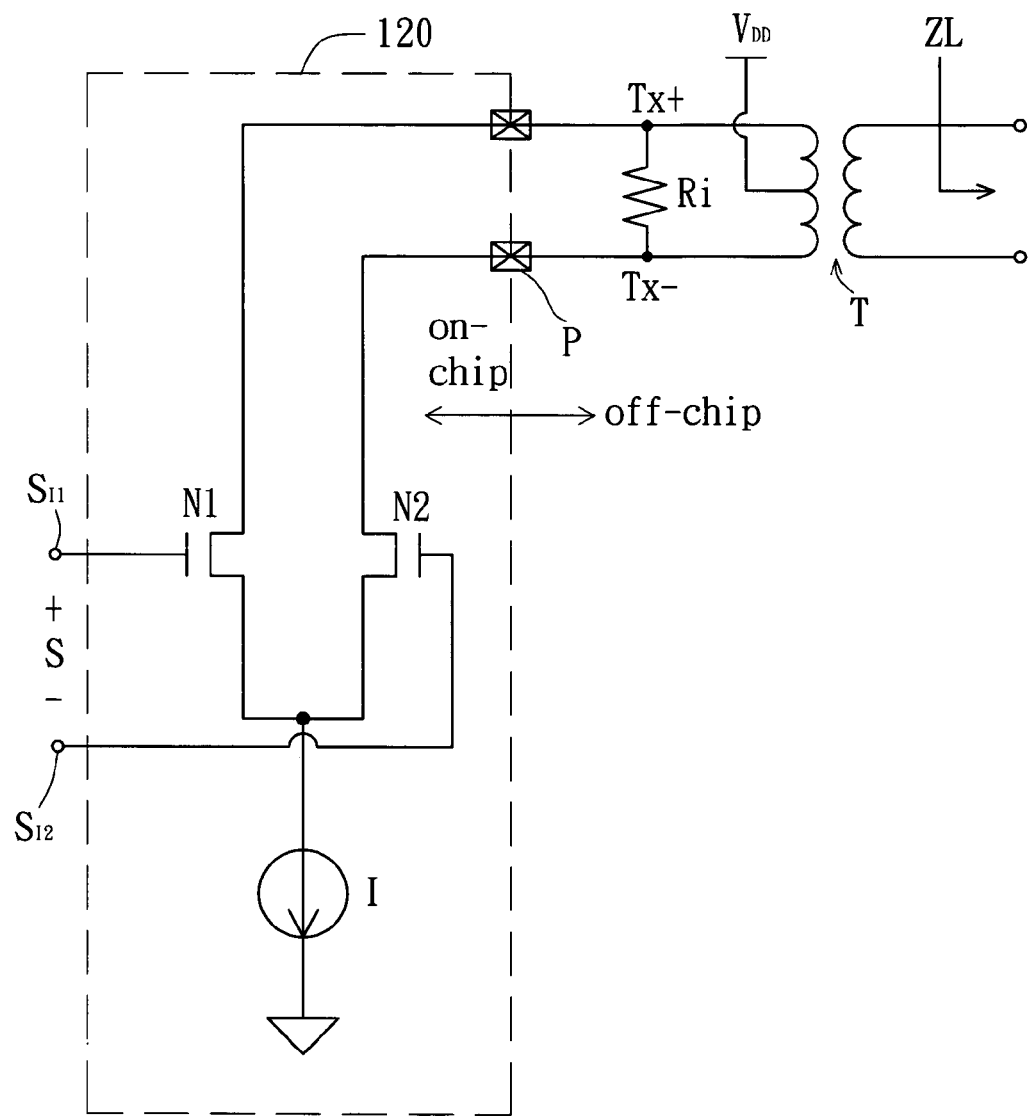
FIG. 1B is a schematic illustration showing a transmitter for transmitting the differential transmission signal in the transceiver of FIG. 1A.
Figure 2A:
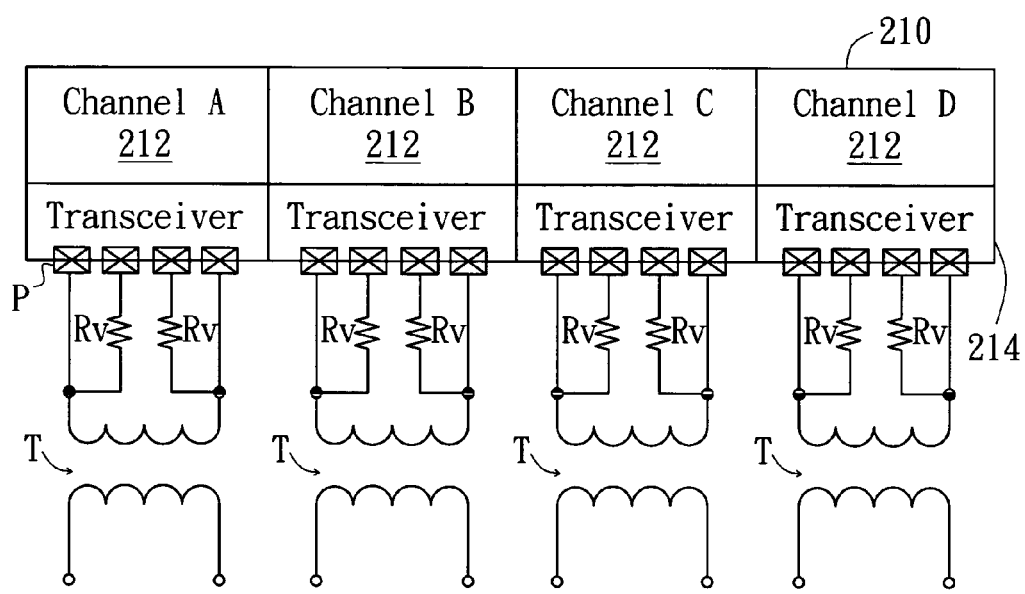
FIG. 2A is a schematic illustration showing a conventional network device having voltage-mode transmitters.
Figure 2B:
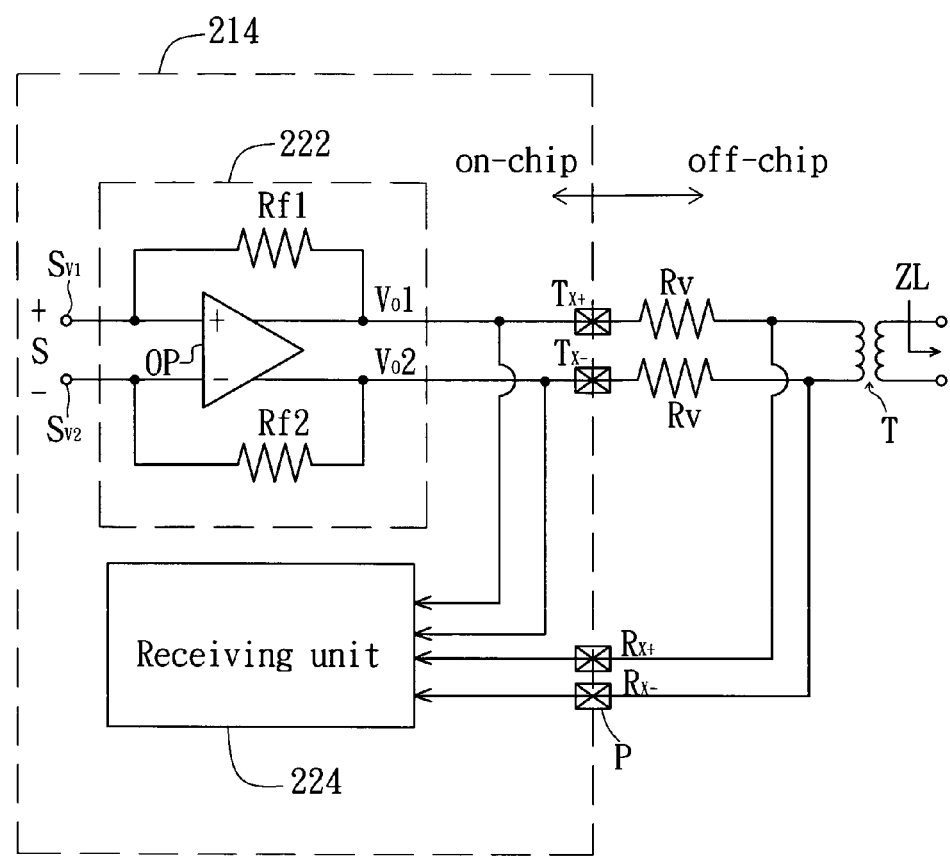
FIG. 2B is a schematic illustration showing a transmitter in the transceiver of FIG. 2A.
Figure 3:
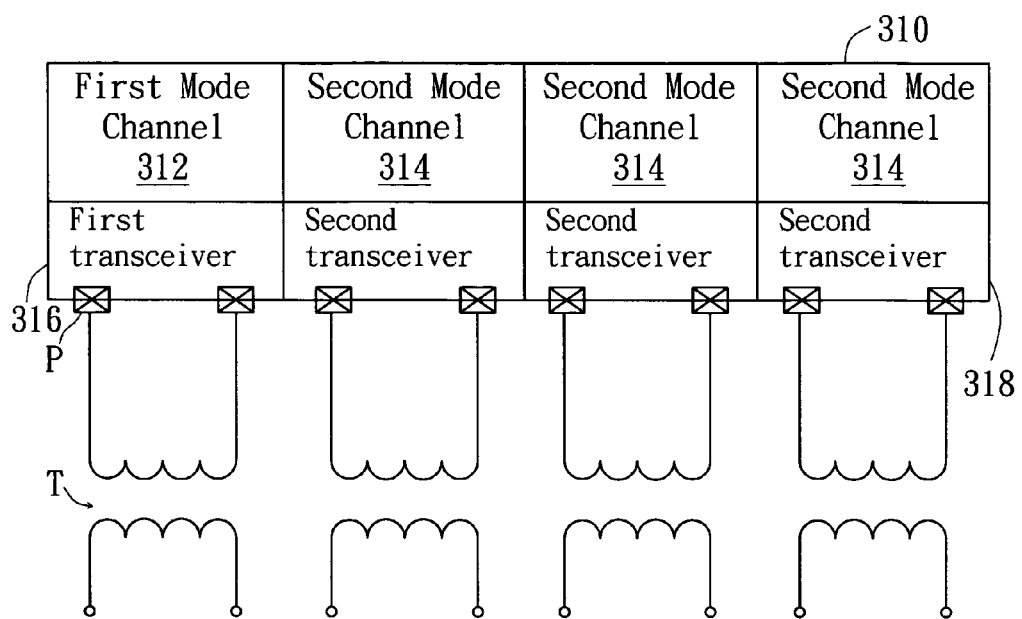
FIG. 3 is a schematic illustration showing a network device having a hybrid transmitter according to a preferred embodiment of the invention.

FIG. 3 is a schematic illustration showing a network device having a hybrid transmitter according to a preferred embodiment of the invention. The network device 300 includes a physical layer control chip 310 and transformers T. The physical layer control chip 310 includes a first mode channel 312 and three second mode channels 314, wherein the first mode channel 312 includes a control unit and a first transceiver 316, which includes a hybrid-mode (current mode and voltage mode) transmitter. The second mode channel 314 includes a control unit and a second transceiver 318, which includes a voltage-mode transmitter. The transformer T is for filtering out the DC component of the received or outputted signal. The input/output pins P are electrically connected to the primary side of the corresponding transformer T, and the secondary side of the transformer T is coupled to a twisted pair.

It is to be noted that the matching resistors Rm1 and Rm2 are disposed in the physical layer control chip 310 and are simultaneously calibrated when the power is on in this embodiment. Consequently, each channel only needs two input/output pins P, wherein the preferred embodiment of each of the matching resistors Rm1 and Rm2 is an impedance-adjustable device.

When the network device 300 is operating at 10 Mbs, at least one of the voltage mode transmitter and the current mode transmitter of the first mode channel 312 has to be enabled for transmitting while one of the second mode channels 314 is enabled for receiving. When the network device 300 is operating at 100 Mbs, only the voltage mode transmitter of the first mode channel 312 and one of the second mode channels 314 have to be enabled for transmitting and receiving. When the network device 300 is operating at 1 Gbs, the voltage mode transmitter of the first mode channel 312 and all the second mode channels 314 have to be enabled for transmitting and receiving.

Figure 4:
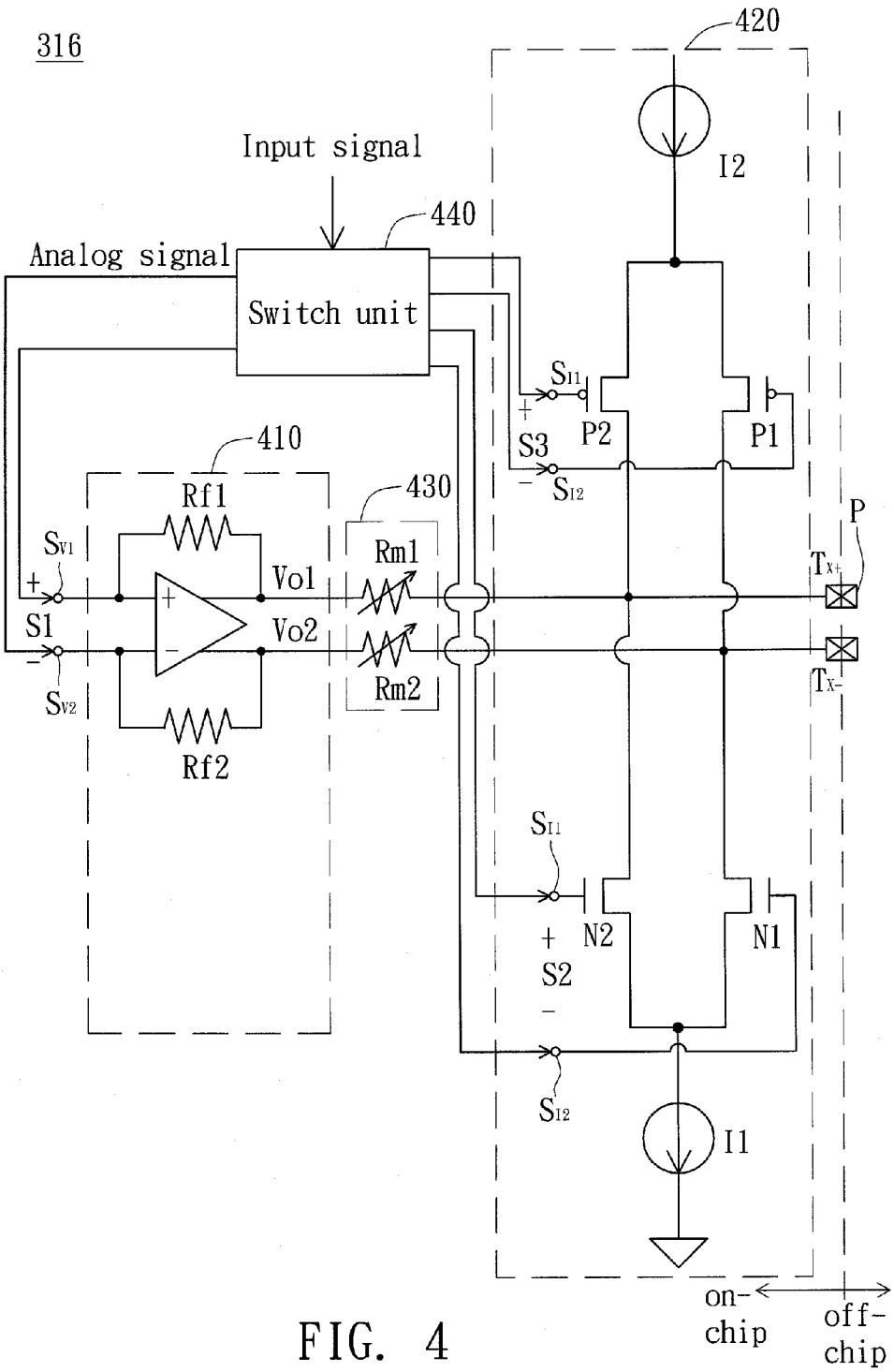
FIG. 4 is a schematic illustration showing a hybrid transmitter according to the preferred embodiment of the invention.

FIG. 4 is a schematic illustration showing the transceiver 316 according to the preferred embodiment of the invention. The transceiver 316 includes the hybrid-mode transmitter, which includes a voltage mode driver 410, a current mode driver 420 and an impedance-matching device 430.

When the network device 300 is operating at 100 Mbs/1Gbs, the first mode channel 312 enables the voltage mode driver 410 for transmitting or receiving. When the network device 300 is operating at 10 Mbs, there are two ways to control the transmission: the first way is to use the current mode driver 420 only for transmission, the second way is to use both the voltage mode driver 410 and the current mode driver 420 for transmission.

The voltage mode driver 410 showing in FIG. 4 includes a first signal input terminal S1 having input terminals $S_{V1}$ and $S_{V2}$, a differential operational amplifier OP and feedback resistors Rf1 and Rf2. The input terminals $S_{V1}$ and $S_{V2}$ are for receiving analog current input signals. The differential operational amplifier OP has a noninverting input terminal and an inverting input terminal electrically connected to the input terminals $S_{V1}$ and $S_{V2}$, respectively. The differential operational amplifier OP amplifies the analog input signals and outputs differential output signals Vo1 and Vo2 with inverse phases from each other. The differential output signals Vo1 and Vo2 are fed back to the two input terminals $S_{V1}$ and $S_{V2}$ through the feedback resistors Rf1 and Rf2. In addition, the differential output signals Vo1 and Vo2 are electrically connected to the input/output pins P through the matching resistors Rm1 and Rm2, respectively. The input/output pins output the differential transmission signals Tx+ and Tx− according to the differential output signals Vo1 and Vo2 outputted from the differential operational amplifier OP. The impedance ZL of a twisted pair is 100 Ω, so each of the matching resistors Rm1 and Rm2 is 50 Ω.

The voltage mode driver 410 may advantageously save the power for only the current of 10 mA is needed. The voltage mode driver 410 is enabled when the network device 300 is operating at 100 Mbs/1Gbs, wherein the peak-to-peak voltage value of the transmission signal is 2V. Thus, there is no problem of the too-large voltage swing.

The current mode driver 420 is enabled when the network device 300 is operating at 10 Mbs. The current mode driver 420 includes a second signal input terminal S2 having two input terminals $S_{I1}$ and $S_{I2}$, and a third signal input terminal S3 having two input terminals $S_{I1}$ and $S_{I2}$. The gate electrodes of the transistor pair N1 and N2 for receiving input signals are coupled to the two input terminals $S_{I1}$ and $S_{I2}$ of the second signal input terminal S2, respectively. In addition, the source electrodes of the transistor pair N1 and N2 are coupled to the first current source I1, and the drain electrodes thereof are coupled to the matching resistors Rm1 and Rm2, respectively. The gate electrodes of the transistor pair P1 and P2 for receiving input signals are coupled to the two input terminals $S_{I1}$ and $S_{I2}$ of the third signal input terminal S3. In addition, the source electrodes of the transistor pair P1 and P2 are coupled to the second current source I2, and the drain electrodes thereof are coupled to the matching resistors Rm1 and Rm2, respectively. In this embodiment, because the coil at the primary side of the transformer T has no central tap to be connected to the DC power, two current sources I1 and I2 are needed. If the impedance ZL of the twisted pair is 100 Ω, then the current-mode transmitter requires the matching impedances of 100 Ω to be connected in parallel. The impedance looked into the differential operational amplifier OP from the output terminal thereof is low, so the matching resistors Rm1 and Rm2 may be regarded as being connected in series and being connected to the impedance ZL of the twisted pair in parallel. Consequently, the matching resistors Rm1 and Rm2 also meet the matching impedance required by the current-mode transmitter.

When the network device 300 uses the first way for 10 Mbs transmission, that is to use current mode driver 420 only, the current sources I1 and I2 are respectively 50 mA for supporting 5V peak-to-peak output at input/output pins P, wherein each of the matching resistors Rm1 and Rm2 is 50 Ω and the impedance ZL of the twisted pair is 100 Ω.

When the network device 300 uses the second way for 10 Mbs transmission, that is to use both the voltage mode driver 410 and the current mode driver 420, the voltage mode driver 410 operates in the same way as at 100 Mbs/1Gbs and supplies 2V peak-to-peak output at input/output pins P. In addition, the current mode driver 420 supplies 3V peak-to-peak output at input/output pins P, such that the total output is 5V peak-to-peak. Each of the current sources I1 and I2 of the current mode driver 420 requires only 30 mA, which is smaller and thus consumes less power.

The hybrid-mode transmitter of the invention further includes a switch unit 440 as shown in FIG. 4. When the network device 300 is operating at the first way for 10 Mbs transmission, the switch unit 440 couples the input signals to the second signal input terminal S2 and the third signal input terminal S3, respectively. At this time, the current mode driver 420 of the hybrid-mode transmitter provides the differential transmission signals Tx+ and Tx− for output.

When the network device 300 is operating at 100 Mbs/1Gbs, the input signal will be converted into an analog current signal by a signal converting unit (not shown) and then coupled to the first signal input terminal S1 via the switch unit 440. At this time, the voltage mode driver 410 of the hybrid-mode transmitter provides the differential transmission signals Tx+ and Tx− for output.

When the network device 300 is operating at the second way for 10 Mbs transmission, the switch unit couples the input signal to the second input terminal S2 and the third input terminal S3 and additionally it also couples an analog signal, which is generated by the signal converting unit from the input signal, to the first input terminal S1. At this time, both the voltage mode driver 410 and the current mode driver 420 of the hybrid-mode transmitter provide the differential transmission signals Tx+ and Tx− for output. The above-mentioned input signal is used both for the voltage mode driver 410 and the current mode driver 420, and the signal converting unit is a digital-to analog converter (DAC).

Figure 5:
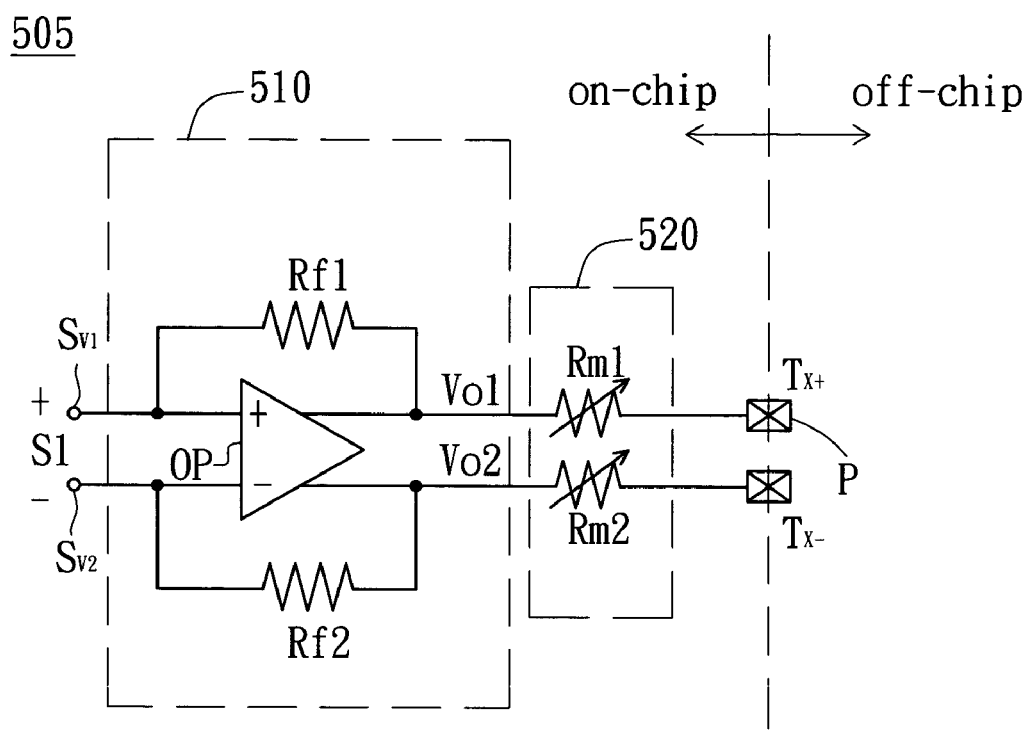
FIG. 5 is a schematic illustration showing a voltage-mode transmitter for a second mode channel of FIG. 3.

FIG. 5 is a schematic illustration showing a voltage-mode transmitter for a second mode channel of FIG. 3. The transmitter 505 of the second mode channel 314 includes a voltage mode driver 510, the preferred embodiment of which is the same as the voltage mode driver 410 depicted in FIG. 4. Consequently, the voltage mode driver 510 has the advantage of saving the power and is enabled when the network device 300 is operating at 100 Mbs/1Gbs. At this time, the peak-to-peak voltage of the transmission signal is 2V, and there is no problem of the too-large voltage swing. In this embodiment, in addition to the voltage mode driver 510, the voltage-mode transmitter disposed in the second mode channel further includes a pair of impedance matching resistors Rm1 and Rm2 for calibration when the power is on. Consequently, the second mode channel only needs two input/output pins P. Each of the impedance matching resistors Rm1 and Rm2 may be adjustable impedance.

When the network device 300 is operating at 1Gbs, the voltage mode driver 410 of the first mode channel 312 and the voltage mode drivers 510 of the second mode channels 314 are enabled for the purpose of transmitting signals. Thus, the power-saving effect may be obtained, and the voltage swing is not too large. When the network device 300 is operating at 100Mbs, the voltage mode driver 410 of the first mode channel 312 is enabled in order to transmit the signals. Thus, the power-saving effect may be obtained and the voltage swing cannot be too large. When the network device 300 is operating at 10Mbs, either the current mode driver 420 of the first mode channel is enabled solely or both the current mode driver 420 and the voltage mode driver 410 are enabled in order to transmit the signals. Thus, there is no problem of the too-large voltage swing of the voltage mode driver 410.

Figure 6:
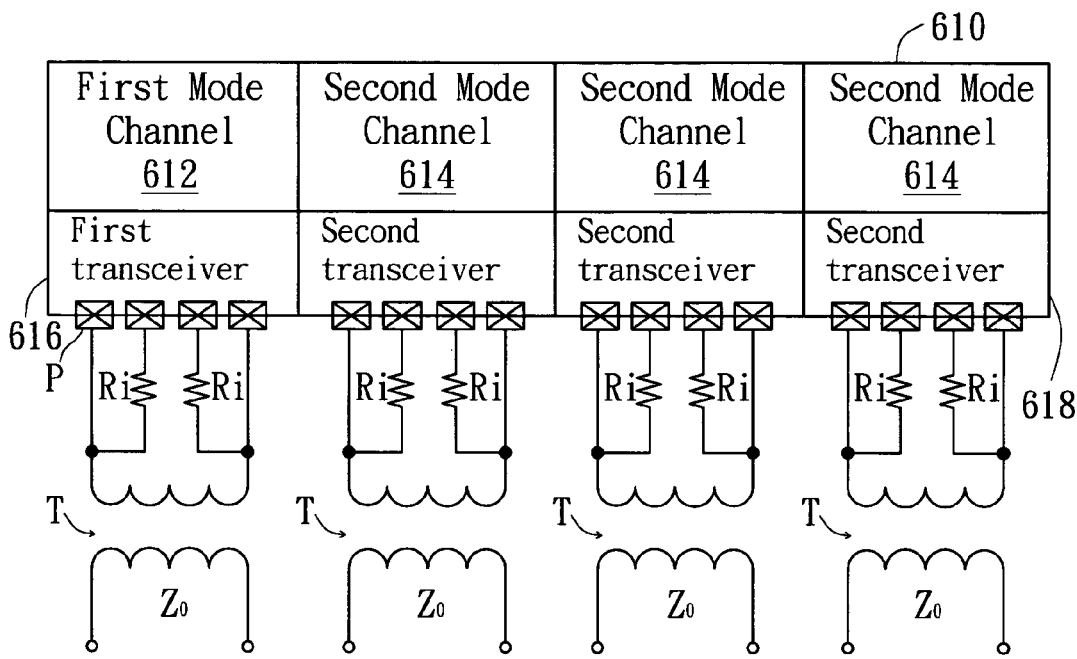
FIG. 6 is a schematic illustration showing a network device with a hybrid transmitter according to another preferred embodiment of the invention.
Figure 7:
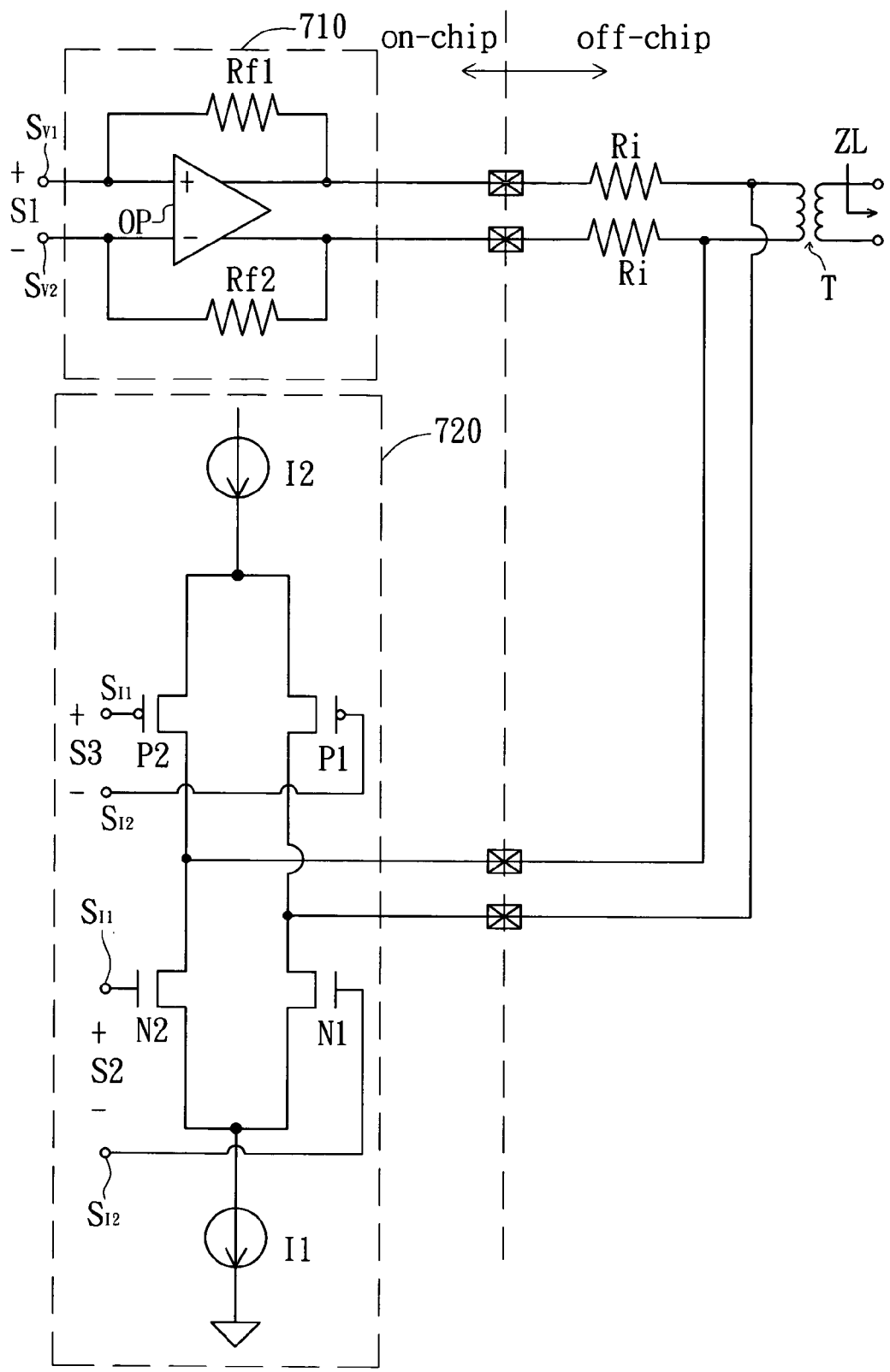
FIG. 7 is a circuit block diagram showing the hybrid-mode transmitter of FIG. 6.

Although the matching resistors of the embodiments of the invention are built in the control chip, they may be externally connected to the physical layer (PHY) control chip as that in the conventional way. FIG. 6 is a schematic illustration showing network device with a hybrid transmitter according to another preferred embodiment of the invention. The present embodiment is different from the previous embodiment of FIG. 4 in that the each channel has two impedance matching resistors $R_v$ disposed outside the physical layer control chip and coupled to the primary side of the transformer in this embodiment. FIG. 7 is a circuit block diagram showing the hybrid-mode transmitter of FIG. 6. Referring to FIGS. 7 and 4, the difference between the embodiment of FIG. 7 and the previous embodiment of FIG. 4 is that the voltage mode driver 710 and the current mode driver 720 output differential transmission signals by different pins P in FIG. 7. Other working principle of FIG. 7 is the same as that of the previous embodiment of FIG. 4, and detailed descriptions thereof will be omitted.

The network device having the hybrid-mode transmitter has the following advantages.

1. Since the voltage mode driver is adopted at the high-rate transmission, the power consumption may be reduced.
2. Since the current mode driver is adopted at the low-rate transmission, the voltage swing is small.

While the invention has been described by way of examples and in terms of preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A network device for transmitting a differential transmission signal at a transmission rate, which is either a first transmission rate or a second transmission rate, the network device comprising:
   one first mode channel, which comprises:
   a hybrid-mode transmitter for outputting the differential transmission signal, wherein the hybrid-mode transmitter comprises:
   at least one voltage mode driver; and
   at least one current mode driver; and
   three second mode channels, each comprising:
   a second mode driver being one of a second voltage mode driver and a second current mode driver;
   wherein the network device transmits the differential transmission signal at the first transmission rate through the at least one voltage mode driver and the second mode driver, and the network device transmits the differential transmission signal at the second transmission rate through at least one of the at least one current mode driver and the at least one voltage mode driver.

2. The network device according to claim 1, wherein the at least one voltage mode driver comprises:
   a first input terminal and a second input terminal for receiving a first input signal;
   a differential operational amplifier comprising a noninverting input terminal and an inverting input terminal coupled to the first and second input terminals, respectively, and also comprising a noninverting output terminal and an inverting output terminal;
   a first feedback impedance coupled between the noninverting output terminal of the differential operational amplifier and the first input terminal; and
   a second feedback impedance coupled between the inverting input terminal of the differential operational amplifier and the second input terminal.

3. The network device according to claim 2, wherein the first input signal is a current signal.

4. The network device according to claim 1, wherein the at least one current mode driver comprises:
   a first current source;
   a second current source;
   a first transistor pair with source electrodes coupled to the first current source, gate electrodes for receiving a second input signal, and drain electrodes coupled to a first output terminal and a second output terminal, respectively, for outputting the differential transmission signal; and
   a second transistor pair with source electrodes coupled to the second current source, gate electrodes for receiving the second input signal, and drain electrodes coupled to the first output terminal and the second output terminal, respectively, for outputting the differential transmission signal.

5. The network device according to claim 4, wherein the second input signal is a digital signal.

6. The network device according to claim 4, wherein the first transistor pair is one of an NMOS transistor pair and a PMOS transistor pair.

7. The network device according to claim 1, wherein the first transmission rate represents 1Gbs and the second transmission rate represents 100 Mbs or 10 Mbs.

8. The network device according to claim 1, wherein the hybrid-mode transmitter further comprises:
   a first matching impedance and a second matching impedance coupled to the at least one voltage mode driver and the at least one current mode driver, respectively.

9. The network device according to claim 8, wherein the first and second matching impedances are impedance-adjustable devices.

10. The network device according to claim 8, wherein the first and the second matching impedances are embedded in an integrated circuit (IC).

11. The network device according to claim 1, wherein the hybrid-mode transmitter further comprises a signal generator for generating an input signal for at least one of the at least one voltage mode driver and the at least one current mode driver according to the transmission rate such that the transmitter outputs the differential transmission signal correspondingly.

12. The network device according to claim 11, wherein the input signal is an digital input signal.

13. The network device according to claim 12, wherein the hybrid-mode transmitter further comprises an digital-to-analog converter (DAC) for converting the digital input signal to an analog input signal, which is input to the at least one voltage mode driver.

14. The network device according to claim 1, wherein the hybrid transmitter further comprises a switch unit coupled to the at least one voltage mode driver and the at least one current mode driver for selecting at least one of the at least one voltage mode driver and the at least one current mode driver to output the differential transmission signal.

15. The network device according to claim 7, wherein the network device transmits the differential transmission signal at 10 Mbs through both of the at least one voltage mode driver and the at least one current mode driver.

16. A network device for transmitting a differential transmission signal at a transmission rate, which is either a first transmission rate, a second transmission rate or a third transmission rate, the network device comprising:
   a first mode channel, comprising:
      a hybrid-mode transmitter for outputting the differential transmission signal, comprising:
         a first voltage mode driver; and
         a first current mode driver; and
   a plurality of second mode channels, each comprising a second voltage mode driver;
   wherein the network device transmits the differential transmission signal at the first transmission rate through the first voltage mode driver and the plurality of the second voltage mode drivers, the network device transmits the differential transmission signal at the second transmission rate through at least one of the first voltage mode driver and the second voltage mode drivers and the network device transmits the differential transmission signal at the third transmission rate through at least one of the first voltage mode driver and the first current mode driver.

17. The network device according to claim 16, wherein the first, second and third transmission rates are 1 Gbps, 100 Mbps and 10 Mbps, respectively.

* * * * *

UNITED STATES PATENT AND TRADEMARK OFFICE
CERTIFICATE OF CORRECTION

PATENT NO. : 7,483,688 B2
APPLICATION NO. : 10/909811
DATED : January 27, 2009
INVENTOR(S) : Chen-Chih Huang et al.

It is certified that error appears in the above-identified patent and that said Letters Patent is hereby corrected as shown below:

On the title page of the patent:

item (75) - add the inventor --Min-Yuh Yeh, Da-an District, Taipei City (TW).-- after the inventor Chih-Wen Huang, Dashe Township, Kaohsiung County (TW)

Signed and Sealed this

Fifth Day of October, 2010

David J. Kappos
*Director of the United States Patent and Trademark Office*